United States Patent [19]
Takahashi

[11] Patent Number: 5,860,497
[45] Date of Patent: Jan. 19, 1999

[54] HYDRAULIC SHOCK ABSORBER WITH REMOVABLE COMPONENTS

[75] Inventor: Koukichi Takahashi, Shizuoka, Japan

[73] Assignee: HKS Co., Ltd., Fujinomiya, Japan

[21] Appl. No.: 874,020

[22] Filed: Jun. 12, 1997

[51] Int. Cl.[6] ........................................... F16F 9/32
[52] U.S. Cl. ........................... 188/314; 188/322.18
[58] Field of Search ........................... 188/249, 314, 188/322.16, 322.18, 322.14; 267/113, 218, 118

[56] References Cited

U.S. PATENT DOCUMENTS

| | | | |
|---|---|---|---|
| 2,808,904 | 10/1957 | O'Connor et al. | 188/314 |
| 3,762,514 | 10/1973 | Freitag | 188/314 |
| 4,106,596 | 8/1978 | Hausmann | 188/314 |
| 4,544,049 | 10/1985 | Shellhause | 188/322.18 |

FOREIGN PATENT DOCUMENTS 0526050  4/1993  Japan .

Primary Examiner—Matthew C. Graham
Attorney, Agent, or Firm—Dvorak & Orum

[57] ABSTRACT

A hydraulic shock absorber is provided with a cylinder formed of a straight pipe, and inside the cylinder, opposite end portions of a base piston are fixed to the inner face by a pair of retainer member C-rings so that a free piston can be received in a lower portion of the cylinder.

3 Claims, 6 Drawing Sheets

HYDRAULIC SHOCK ABSORBER WITH REMOVABLE COMPONENTS

BACKGROUND OF THE INVENTION

1. Field of the Invention

The present invention relates to a hydraulic shock absorber.

2. Discussion of the Background Art

A conventional hydraulic shock absorber for vehicles disclosed in Japanese Patent Application Publication (JP-B) No. 5-26050. The hydraulic shock absorber comprising a cylinder; a piston rod which is inserted into the cylinder; a piston which is connected to an end portion of the piston rod inserted in the cylinder while including a damping valve, and which partitions the cylinder into a rod-side chamber where the piston rod is received, and a counter rod-side chamber where the piston rod is not received; a base piston which is fixedly provided on the counter rod-side chamber, and includes a damping valve; a sub-cylinder which is communicated with a side opposite to the piston and between the base piston in the counter rod-side chamber of the cylinder, and a free piston being movably received in the sub-cylinder. The conventional hydraulic shock absorber is constructed in a manner that a hydraulic fluid is inserted into the cylinder side of the free piston of the sub-cylinder, and a counter cylinder side of the free piston of the sub-cylinder is defined as a gas chamber.

In the prior art, a case end is welded to an end portion of a cylinder formed of a straight pipe, and the case end is formed with a closed recess portion having a stepped portion at the inner part thereof. A base piston is abutted against the stepped portion of the case end, and is fixed by means of a come-off preventive member attached to an opening side of the closed recess portion.

The following problems exist in the prior art.
 (i) The base piston is fixed in a state of being abutted against the closed recess portion formed in the case end; for this reason, there is a need of subjecting the case end to a complicate processing.
 (ii) For the free piston to receive in the cylinder in addition to the base piston, the free piston must be received in the most inner part of the closed recess portion formed of the case end of the cylinder. For this reason, the inner face of the closed recess portion formed in the case end must be subjected to a complicate processing to securing slidability of the free piston.

SUMMARY OF THE INVENTION

An object of the present invention is to provide a hydraulic shock absorber capable of fixing a base piston to a cylinder and receiving a free piston in the cylinder by means of a simple structure.

To attain the above objective, the present invention provides a hydraulic shock absorber comprising a cylinder; a piston rod which is inserted into the cylinder; a piston which is connected to an end portion of the piston rod inserted in the cylinder including a damping valve, and which partitions the cylinder into a rod-side chamber where the piston rod is received, and a counter rod-side chamber where the piston rod is not received; a base piston fixedly provided on the counter rod-side chamber, and includes a damping valve; and a free piston which is arranged on the opposite side of the piston between the base piston so as to be movably received in the counter rod-side chamber of the cylinder; the counter rod-side chamber being partitioned into a piston-side chamber defined between the piston and the base piston, a base valve chamber defined between the base piston and the free piston, and a gas chamber on a counter side of the free piston adjacent to the base piston, a hydraulic fluid being filled into the rod-side chamber, the piston-side chamber and the base valve chamber. The hydraulic shock absorber having a construction in which the cylinder is formed of a straight pipe, and opposite end portions of the base piston are fixed by means of a come-off preventive member attached onto an inner face of said straight pipe so that the free piston is received in the straight pipe.

BRIEF DESCRIPTION OF THE DRAWINGS

The present invention will be understood more fully from the detailed description given hereinbelow and from the accompanying drawings of the preferred embodiments of the invention, which are given by way of example only, and are not intended to limit the present invention.

In the drawings.

DESCRIPTION OF THE PREFERRED EMBODIMENTS (First embodiment)(FIG. 1 to FIG. 7)

Figure 1:
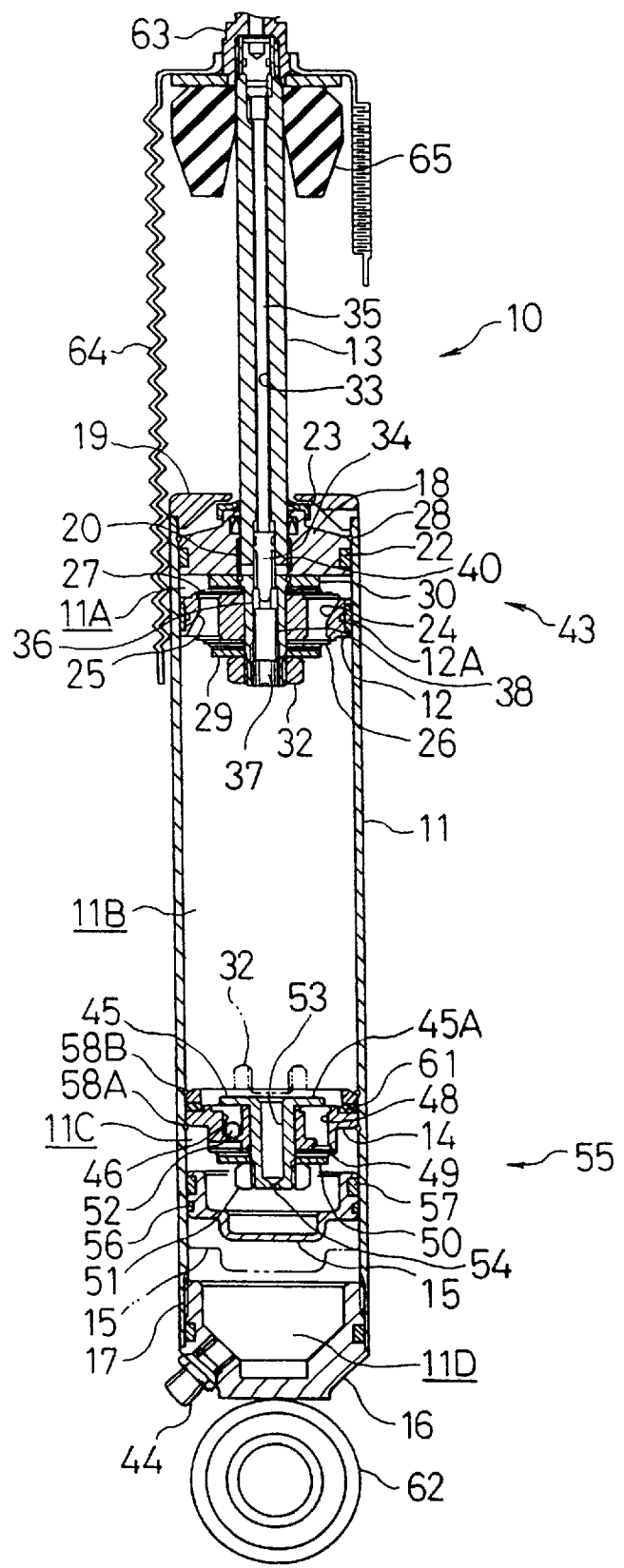
FIG. 1 is a view schematically showing the entire construction of a hydraulic shock absorber according to a first embodiment of the present invention.

A hydraulic shock absorber 10 shown in FIG. 1 is a single-cylinder type shock absorber. The hydraulic shock absorber 10 has a piston 12 slidably provided in a cylinder 11 while a hydraulic fluid is filled therein, and one end portion of a rod 13 is connected to the piston 12. Also, a base piston 14 is located on the cylinder 11 side where the rod 13 is not received, and a free piston 15 is slidably provided. FIG. 1 shows the maximum elongated state of the hydraulic shock absorber 10. Incidentally, the hydraulic fluid is filled in a rod-side chamber 11A, a piston-side chamber 11B, a base valve chamber 11C of the cylinder 11, which will be described later.

The aforesaid cylinder 11 is formed of a straight pipe. An end member 16 is connected to one end portion of the cylinder on the side where the base piston 14 and the free piston 15 are located. The end member 16 is a closing member for closing an opening of the one end portion of cylinder so that a fluid does not escape. Further, the end member is attached to the cylinder by means of a screw portion 17 so as to be removable.

Figure 2:
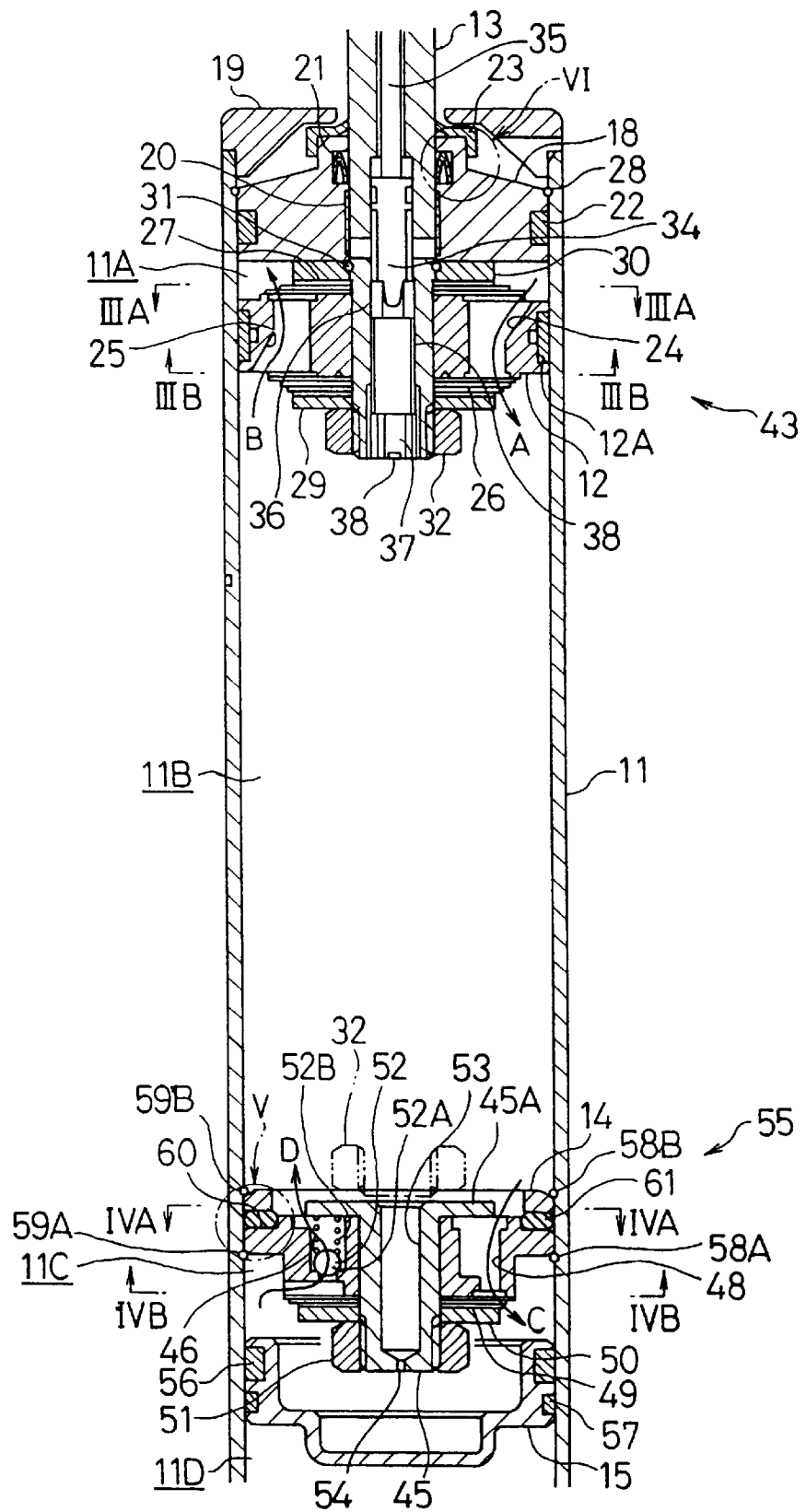
FIG. 2 is an enlarged view of principal parts of the hydraulic shock absorber shown in FIG. 1.

Moreover, as shown in FIG. 2, a rod guide 18 is provided in an end portion of the cylinder 11 on the side where the rod 13 is received. The rod guide 18 is located to prevent escape of fluid. A cap 19 is fitted outside the rod guide 18. The rod 13 penetrates the rod guide 18 and the cap 19, and extends outward of the cylinder 11. The rod guide 18 is situated in a specified position by a pressure of the hydraulic fluid in the cylinder 11 in a state of being stopped by means of a C ring 28 fitted in the inner periphery of the cylinder 11.

The rod guide 18 is fitted with a guide bush 20 for slidably guiding the rod 13 at the inner periphery thereof. Further, the rod guide 18 is provided with an oil seal 21 at the inner periphery thereof, and is provided with an O ring 22 at the outer periphery thereof. In this manner, the cylinder 11 is constructed so that a fluid does not escape. Moreover, the rod guide 18 is equipped with a dust seal 23 which abuts against the outer periphery of the rod 13.

Figure 3A:
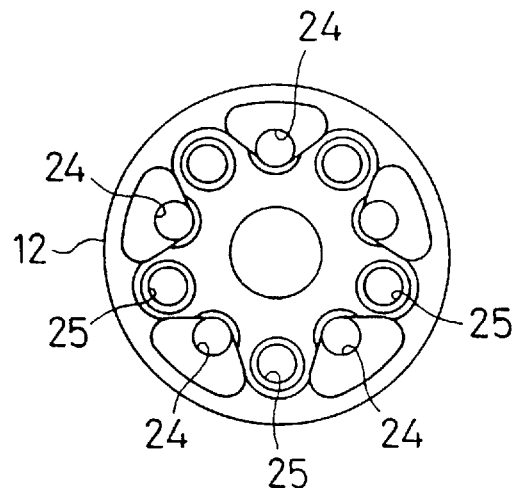
FIG. 3A is a cross sectional view cut along a line IIIA—IIIA of FIG. 2.
Figure 3B:
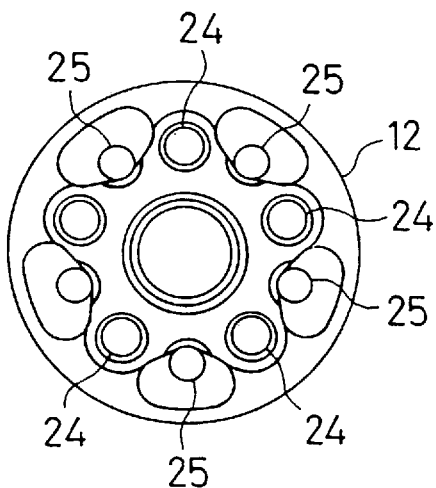
FIG. 3B is a cross sectional view cut along a line IIIB—IIIB of FIG. 2.

One end portion of the rod 13 is penetrated through the center portion of the piston 12. As shown in FIG. 3A and FIG. 3B, the piston 12 is provided with an elongation-side fluid passage 24 and a contraction-side fluid passage 25 which are alternately formed around the rod 13. One end face of the piston 12 is provided with an elongation-side damping valve 26 for closing the elongation-side fluid passage 24; the other end face of the piston 12 is provided with a contraction-side damping valve 27 for closing the contraction-side fluid passage 25. The outer periphery of the piston 12 is fitted with a piston ring 12A for slidably guiding the piston 12 in the cylinder 11.

Valve retainers 29 and 30 are respectively arranged on the back sides of the elongation-side damping valve 26 and the contraction-side damping valve 27. The valve retainer 30 is supported by means of a C ring 31 fitted onto the rod 13; on the other hand, the valve retainer 29 is pressed by means of a lock nut 32 engaging the rod 13. The piston 12, the valve retainer 29, the elongation-side damping valve 26, the contraction-side damping valve 27 and the valve retainer 30 are held between the C ring 30 and the lock nut 32, and thus, are integrated with the rod 13. The cylinder 11 is partitioned into a rod-side chamber 11A and a piston-side chamber 11B by the piston 12, thus integrated with the rod 13, etc. The rod-side chamber 11A and piston-side chamber 11B are filled with a hydraulic fluid.

The rod 13 is hollow. A hollow portion of the rod 13 is provided with an adjusting rod 35 penetrating therethrough and a cylindrical body 36. The adjusting rod has a needle 34 formed on the distal end portion thereof. An orifice is defined by a cone face of the needle 34 and an inner peripheral edge portion of the cylindrical body 36. The rod-side chamber 11A and the piston-side chamber 11B communicate with each other through the orifice. An opening of the orifice is adjusted by operating the adjusting rod 35 from the exterior. A reference numeral 37 denotes a cap screw with an oil line, and 38 denotes a collar. The cylindrical body 36 is held by means of the cap screw 37 and the collar 38.

The aforesaid elongation-side damping valve 26, contraction-side damping valve 27, needle 34 and the cylindrical body 36 constitute a piston valve mechanism 43. In a compression stroke of the hydraulic shock absorber 10, during a medium or high speed reciprocation of the piston 12, as shown by an arrow B in FIG. 2, a hydraulic fluid in the piston-side chamber 11B flows through the contraction-side fluid passage 25 so that the contraction-side damping valve 27 can be elastically deformed, and then, flows into the rod-side chamber 11A. When the hydraulic fluid elastically deforms the contraction-side damping valve 27, there is generated a damping force during the medium or high speed reciprocation of the piston 12 in the compression stroke.

Also, during a low speed reciprocation of the piston 12 in the compression stroke of the hydraulic shock absorber 10, the hydraulic fluid in the piston-side chamber 11B flows through the orifice between the needle 34 and the cylindrical body 36 in the rod 13, and then, flows into the rod-side chamber 11A. When the hydraulic fluid flows through the orifice, there is generated a damping force during the low speed reciprocation of the piston 12 in the compression stroke.

Moreover, in an elongation stroke of the hydraulic shock absorber 10, during a medium or high speed reciprocation of the piston 12, as shown by an arrow A in FIG. 2, a hydraulic fluid in the piston-side chamber 11A flows through the elongation-side fluid passage 24 so that the elongation-side damping valve 26 can be elastically deformed, and then, flows into the rod-side chamber 11B. When the hydraulic fluid elastically deforms the elongation-side damping valve 26, there is generated a damping force during the medium or high speed reciprocation of the piston 12 in the elongation stroke.

Also, during a low speed reciprocation of the piston 12 in the elongation stroke of the hydraulic shock absorber 10, the hydraulic fluid in the piston-side chamber 11A flows through the orifice between the needle 34 and the cylindrical body 36 in the rod 13, and then, flows into the rod-side chamber 11B. When the hydraulic fluid flows through the orifice, there is generated a damping force during the low speed reciprocation of the piston 12 in the elongation stroke.

The aforesaid free piston 15 functions to compensate a hydraulic fluid corresponding to a variable volume of the rod 13 which enters the rod-side chamber 11A or retreats from the rod-side chamber 11A in the compression or elongation stroke of the hydraulic shock absorber 10. The cylinder 11 is formed with a base valve chamber 11C which is defined between the free piston 15 and the base piston 14. Moreover, as shown in FIG. 1, the cylinder 11 is formed with a base chamber 11D which is defined between the free piston 15 and the end member 16. The base valve chamber 11C is filled with hydraulic fluid; on the other hand, the gas chamber 11D is sealed with a gas such as nitrogen gas, etc.

A gas valve 44 (see FIG. 1) provided in the end member 16 is used for supplying a gas to the gas chamber 11D. The outer periphery of the free piston 15 is fitted with a piston ring 56 and an O ring 57. The free piston 15 is slidably guided in the cylinder 11 by means of the piston ring 56. Also, the base valve chamber 11C and the gas chamber 11D are securely kept in a state of air-tight sealing by means of the O ring 57.

Figure 4A:
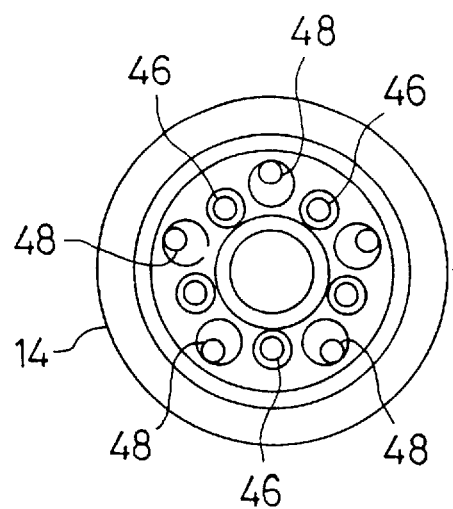
FIG. 4A is a cross sectional view cut along a line IVA—IVA of FIG. 2.
Figure 4B:
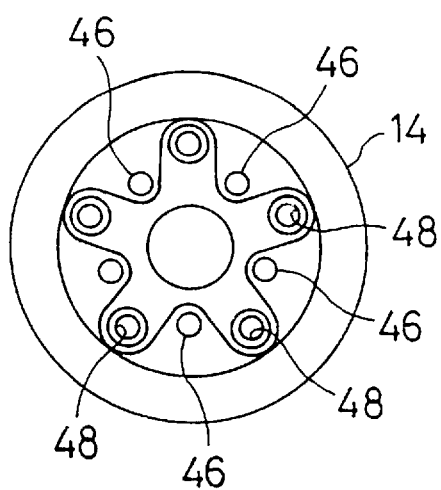
FIG. 4B is a cross sectional view cut along a line IVB—IVB of FIG. 2.

As shown in FIG. 2, the base piston 14 has a base piece member 45 penetrating therethrough and including a flange 45A at the center position thereof. Also, as shown in FIG. 4A and FIG. 4B, the base piston 14 is provided with an elongation-side fluid passage 46 and a contraction-side fluid passage 48 which are alternately formed around the base piece member 45. One end face of the base piston 14 is provided with a contraction-side damping valve 49 for closing the contraction-side fluid passage 48. The contraction-side damping valve 49 is integrated with the base piece member 45 and the base piston 14 by means of a lock nut 51 via a valve retainer 50. Also, the elongation-side fluid passage 46 is provided with a check valve 52 for closing the elongation-side fluid passage 46. In the check valve 52, a ball 52A is urged against a spring 52B supported on the flange 45A of the base piece member 45.

Moreover, the aforesaid base piece member 45 is formed with a base piece hollow portion 53 and an orifice 54 which communicate with each other. The piston-side chamber 11B and the base valve chamber 11C communicate with each other through the base piece hollow portion 53 and orifice 54.

The contraction-side damping valve 49, the orifice 54 of the base piece member 45 and the check valve 52 constitute a base valve mechanism 55. In a compression stroke of the hydraulic shock absorber 10, during a medium or high speed reciprocation of the piston 12 as shown by an arrow C in FIG. 2, a hydraulic fluid corresponding to an increased volume of the rod 13 which comes into the rod-side chamber 11A, flows through the contraction-side fluid passage 48 from the piston-side chamber 11B. And then, the hydraulic fluid flows into the base valve chamber 11C so that the contraction-side damping valve 49 can be elastically deformed. When the hydraulic fluid elastically deforms the contraction-side damping valve 49, there is generated a damping force during the medium or high speed reciprocation of the piston 12 in the compression stroke.

Also, during a low speed reciprocation of the piston 12 in the compression stroke of the hydraulic shock absorber 10, the hydraulic fluid corresponding to an increased volume of the rod 13 which comes into the rod-side chamber 11A, flows through the orifice 54 of the base piece member 45, and then, flows into the base valve chamber 11C. When the hydraulic fluid flows through the orifice 54 of the base piece member 45, there is generated a damping force during the low speed reciprocation of the piston 12 in the compression stroke.

In an elongation stroke of the hydraulic shock absorber 10, in order to eliminate a negative pressure in the piston-side chamber 11B caused when the rod 13 retreats from the rod-side chamber 11A, the hydraulic fluid in the base valve chamber 11C flows as shown by an arrow D (see FIG. 2) so as to open the check valve 52, and then, flows into the piston-side chamber 11b through the elongation-side fluid passage 46. Therefore, no damping force is generated at this time.

As described above, with the piston valve mechanism 43 and base valve mechanism 55 in a compression stroke of the hydraulic shock absorber 10, the piston 12 reciprocates at a low speed, a damping force of the piston 12 during the low speed reciprocation is generated in the orifice between the needle 34 and the cylindrical body 36 in the rod 13 of the piston valve mechanism 43 and in the orifice 54 of the base piece member 45 of the base valve mechanism 55. Also, when the piston 12 reciprocates at a medium or high speed, a damping force of the piston 12 during the medium or high speed reciprocation is generated in the contraction-side damping valve 27 of the piston valve mechanism 43 and in the contraction-side damping valve 49 of the base valve mechanism 55. Also, in an elongation stroke of the hydraulic shock absorber 10, when the piston 12 reciprocates at a low speed, a damping force of the piston 12 during the low speed reciprocation is generated in the orifice between the needle 34 and the cylindrical body 36 of the piston valve mechanism 43. When the piston 12 reciprocates at a medium or high speed, a damping force of the piston 12 during the medium or high speed reciprocation is generated in the elongation-side damping valve 26 of the piston valve mechanism 43.

Figure 5:
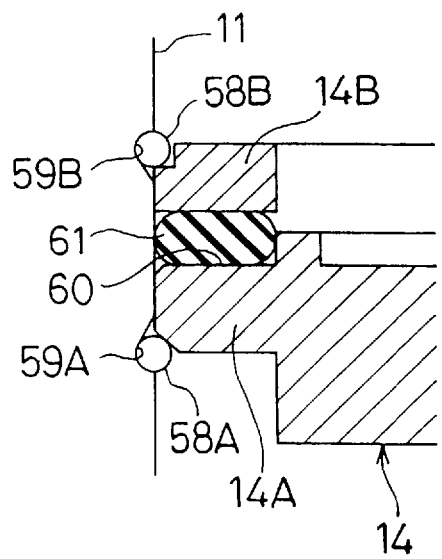
FIG. 5 is an enlarged sectional view of a part V of FIG. 2.

Now, the base piston 14 of the base valve mechanism 55 is fixed to the inner peripheral face of the cylinder 11 by C rings 58A and 58B which function as a come-off preventive member. Specifically, as shown in FIG. 2 and FIG. 5, an inner peripheral face on one end side of the cylinder 11 is formed with two annular grooves 59A and 59B over the entire circumstance thereof. The annular grooves 59A and 59B are fitted with C rings 58A and 58B, and support opposite end faces of the base piston 14, so that the base piston 14 can be fixed to the inner peripheral face of the cylinder 11. In this case, these C rings 58A and 58B may be a circlip, or the like.

The base piston 14 is divided into a first member 14A and second member 14B in the axial direction of the cylinder 11. An elastic member 61 is held between the first member 14A and the second member 14B. The elastic member 61 is, for example, a rubber or a resin bushing, which has excellent vibration absorption performance, and the like.

Figure 6:
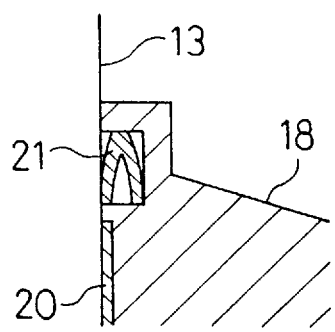
FIG. 6 is an enlarged sectional view of a part VI of FIG. 2.
Figure 7:
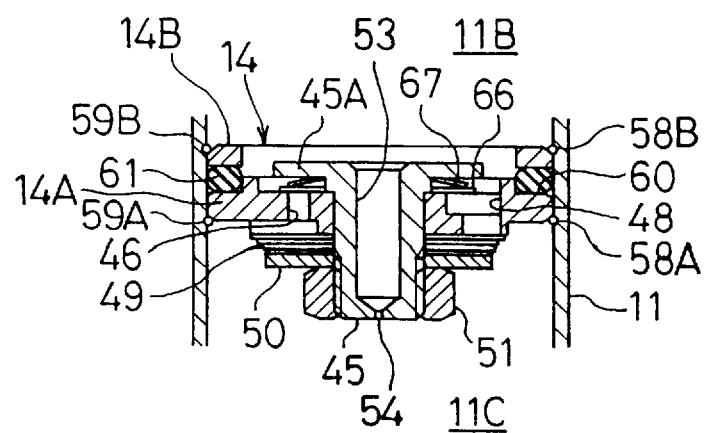
FIG. 7 is a view schematically showing a modification of a base piston.

Further, the base piston 14 has a function for lowering gas pressure of the gas chamber 11D. Specifically, as shown in FIG. 2 and FIG. 6, when the rod-side chamber 11A, the piston-side chamber 11B and the base valve chamber 11C are in a normal pressure state, a lip of the oil seal 21 provided in the rod guide 18 is enlarged in its diameter; therefore, the oil seal 21 can sufficiently perform a seal function. On the other hand, when the rod-side chamber 11A, piston-side chamber 11B and the base valve chamber 11C are in a negative pressure state, the lip of the oil seal 21 is contracted in its diameter; therefore, air is permitted to enter the hydraulic fluid in the rod-side chamber 11A, the piston-side chamber 11B and the base valve chamber 11C. For this reason, gas pressure in the gas chamber 11D is set so that the rod-side chamber 11A does not reach a negative pressure state even in the compression stroke of the hydraulic shock absorber 10. Also, the base piston 14 is provided in the cylinder 11, and a damping force is generated in the contraction-side damping valve 49 and in the orifice of the base piece member 45 in the compression stroke of the hydraulic shock absorber 10, whereby a pressure in the piston-side chamber 11B and the rod-side chamber 11A becomes high, so that the gas pressure in the gas chamber 11D can be lowered.

In FIG. 1, a reference numeral 62 denotes an eye which is fixedly attached to end member 16. The hydraulic shock absorber 10 is supported on an axle shaft by use of the eye 62. Also, the other end portion of the rod 13 is supported on a bracket (not shown) on a vehicle body side by means of a fitting rod 63. In this manner, the hydraulic shock absorber 10 is interposed between the vehicle body and the axle shaft. Reference numeral 64 denotes a boot for protecting the rod 13. The other end portion of the rod 13 is provided with a bound stopper 65. When the hydraulic shock absorber 10 is compressed to the maximum, the bound stopper 65 abuts against the cap 19, so that the maximum compression stroke of the hydraulic shock absorber 10 can be regulated.

Accordingly, the present embodiment has the following effects.

(i) Both end portions of the base piston 10 are fixed by means of C rings 58A and 58B which are fixedly supported to the inner peripheral face of a straight pipe constituting the cylinder 11. Thus, the inner peripheral face of the straight pipe may be merely provided with engagement portions (annular grooves 59A, 59B) for supporting the C rings 58A and 58B. Therefore, the base piston 14 can be fixed to the cylinder 11 by the simple structure described above.

(ii) The free piston 15 is received in the straight pipe constituting the cylinder 11 in which the piston 12 is received and the base piston 14 has been fixed. The straight pipe has already been subjected to processing for securing slidability of the piston 12 so that the free piston 15 is readily slidable. Therefore, the free piston 15 can be received in the cylinder 11 by this simple structure.

(iii) The end member 16 is connected to one end portion of the cylinder 11 by means of a screw portion so that an opening of the end portion can be closed. Thus, the end member 16 is readily separated from one end portion of the cylinder 11. With such a structure, the specification of the damping valve 49 located on the base piston 14 can be easily modified, and it is a great convenience for maintenance and repair of the piston ring 56, the O ring 57 provided on the outer periphery of the free piston 15 interposed between the base piston 14 and end member 16.

(iv) The base piston 14 is divided into the first member 14A and the second member 14B in the axial direction of the cylinder 11, and the elastic member 61 is interposed between the first member 14A and the second member 14B. Thus, the first member 14A and the second member 14B of the base piston 14 are pressed by means of C rings 58A and 58B on the opposite sides of the base piston 14 via an elastic force of the elastic member 61, so that the base piston 14 can be fixed without a clearance. The base piston 14 is prevented from vibrating in the axial direction of the cylinder 11 when the hydraulic shock absorber 10 is actuated. Moreover, even if a vibration is generated in the base piston 14, the vibration is directly absorbed by the elastic member 61 which has excellent vibration absorbing performance. Thereby, noise caused by vibration of the base piston 14 is prevented.

Figure 8:
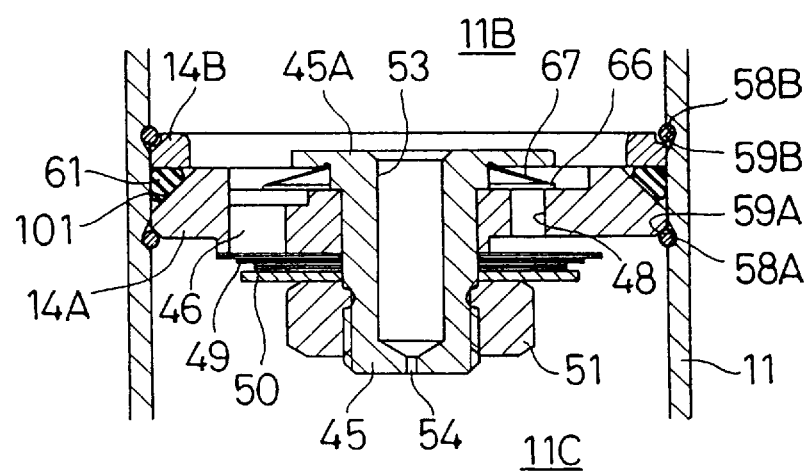
FIG. 8 is a view schematically showing principal parts of the hydraulic shock absorber according to a second embodiment of the present invention.

(Second Embodiment)(FIG. 8)

A second embodiment differs substantially from the first embodiment in the following respects. Specifically, at least one of the first member 14A and the second member 14B constituting the base piston 14, for example, the first member 14A is formed with an elastic member face 101 which is inclined to the inner face of the cylinder 11. Moreover, the elastic member 61 can be pressed by the first member 14A, the second member 14B and the inner face of the cylinder 11.

Therefore, the aforesaid vibration of the base piston 14 can be restricted by the elastic member 61, while seal performance between the inner face of the cylinder 11 and the base piston 14 can be improved.

Also, of the first member 14A and the second member 14B constituting the base piston 14, for example, the second member 14B or both members 14A and 14B may be formed with an elastic member face which is inclined to the inner face of the cylinder 11.

Figure 9:
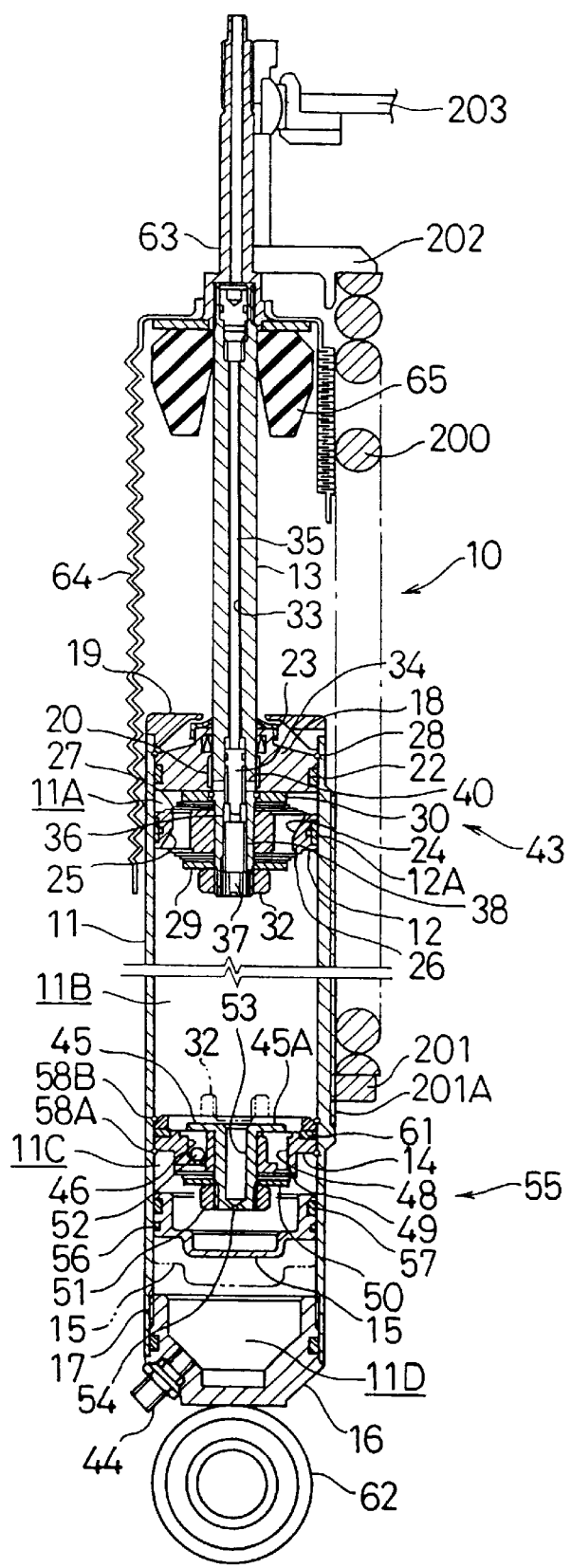
FIG. 9 is a view schematically showing the entire construction of a hydraulic shock absorber according to a third embodiment of the present invention.

(Third embodiment)(FIG. 9)

A third embodiment substantially differs from the first embodiment in that the hydraulic shock absorber 10 additionally includes a suspension spring 200. The suspension spring 200 is interposed between a spring receiver 201 and a spring receiver 202. The spring receiver 201 engages a screw portion 201A provided on the outer peripheral portion of the cylinder 11; on the other hand, the spring receiver 202 is fixed to a fitting rod 63 which is attached to the rod 13 projecting from the cylinder 11. In FIG. 9, a reference numeral 203 denotes a fitting bracket on the vehicle body side of the hydraulic shock absorber 10.

According to the present invention, with the described construction, there can be provided a hydraulic shock absorber which is capable of fixing a base piston to a cylinder and receiving a free piston in the cylinder by means of a simple structure.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above but to include all possible embodiments which can be embodied within a scope encompassed and equivalents thereof with respect to the feature set out in the appended claims.

What is claimed is:

1. A hydraulic shock absorber comprising:

a cylinder;

a piston rod which is inserted into said cylinder;

a piston which is connected to an end portion of said piston rod and is inserted in said cylinder and which includes a damping valve, said piston serving to partition said cylinder into a rod-side chamber where said piston rod is received, and a counter rod-side chamber where said piston rod is not received;

a removable base piston which is fixedly provided on said counter rod-side chamber of the cylinder, and includes a damping valve formed therein, said damping valve capable of varying a damping force within said cylinder; and a free piston which is arranged on the opposite side of said piston between said base piston so as to be movably received in said couter rod-side chamber of said cylinder, said free piston including a replaceable piston ring and O-ring;

said counter rod-side chamber being partitioned into a piston-side chamber defined between said piston and said base piston, a base valve chamber defined between said base piston and said free piston, and a gas chamber defined on a counter base piston side of said free piston, said rod-side chamber, said piston-side chamber and said base valve chamber each including hydraulic fluid therein:

said hydraulic shock absorber having a construction in which said cylinder is formed of a straight pipe, and opposite end portions of said base piston are fixed by means of snap rings preliminarily attached to an inner face of said straight pipe so that said free piston is received in said straight pipe, an end portion of said counter rod-side chamber of said cylinder provided with a closing member for closing an opening of said end portion of said cylinder by a screw means.

2. The hydraulic shock absorber according to claim 1, wherein said base piston is divided into a first member and a second member in an axial direction of said cylinder, and an elastic member is interposed between said first and second members and pressed in order to adjoin the cylinder.

3. The hydraulic shock absorber according to claim 2, wherein at least one of said first and second members has an elastic member fitting face which is inclined to the inner face of said cylinder, and said elastic member is pressed by said first member, said second member and said inner face of said cylinder.

* * * * *